Dec. 8, 1964 R. J. MARTIN 3,160,072
MOTOR WITH DELAYED PRESSURE LOADING
Filed Feb. 23, 1962 2 Sheets-Sheet 1

INVENTOR
Robert J. Martin
BY Hubert J Miller
ATTORNEY

Dec. 8, 1964    R. J. MARTIN    3,160,072
MOTOR WITH DELAYED PRESSURE LOADING
Filed Feb. 23, 1962    2 Sheets-Sheet 2

INVENTOR
Robert J. Martin
BY Hubert Miller
ATTORNEY

United States Patent Office 3,160,072
Patented Dec. 8, 1964

3,160,072
MOTOR WITH DELAYED PRESSURE LOADING
Robert J. Martin, Hutchinson, Kans., assignor to The Cessna Aircraft Company, Wichita, Kans., a corporation of Kansas
Filed Feb. 23, 1962, Ser. No. 175,205
12 Claims. (Cl. 91—87)

This invention relates to rotary, fluid-driven motors employing pressure loaded members such as a bushing or a plate which is urged into sealing engagement against confronting portions of the rotor means in the motor to thereby decrease fluid leakage around the rotor means and increase the volumetric efficiency of the motor. The invention more particularly relates to reversible motors of the pressure loaded type and broadly comprehends positive displacement motors of the single and plural rotor type.

The conventional manner of utilizing fluid pressure to urge the sealing member into sealing engagement with the adjacent rotor means materially increases static friction, which in turn reduces motor starting torque. An efficient rotary motor should have both high starting torque developed by the rotor means and high volumetric efficiency at operating speed.

It is a primary object of this invention to provide, in combination with a pressure loaded motor of the gear type or other postive displacement rotary type, a pressure loading control device which permits the motor to start with little or no pressure loading, thereby reducing static friction and affording high motor starting torque, and which delays so as to apply pressure loading to the pressure sealing member only after the motor has attained a reasonable operating speed, thereby providing high volumetric efficiency after the motor has performed its load starting task.

More specifically, the invention provides a mechanism which admits fluid at a metered pulsation rate under high pressure against the sealing member, and at the same time drains said fluid at an equal or higher rate through a restriction leading from the sealing member, until the motor has performed its load starting task; the mechanism thereupon, as the motor approaches operating speed, admits the fluid at a more frequent pulse rate against the sealing member so that the restriction is less capable of passing the metered fluid, thereby affording a buildup of pressure against the sealing member to urge it into sealing engagement with the rotor means.

The motor hereof is connected in a line in which motive fluid flow can be sustained in either direction, the motor reversing in rotation each time the fluid flow is reversed in the line. The mechanism provided according to this invention includes a metering valve driven at motor shaft speed and a switching valve arrangement providing for flow of the metered fluid from the metering valve always in a direction leading from the upstream side of the motor to its discharge side, with high pressure thus constantly available for the loading sealing function and with the fluid leaving the restriction escaping readily into the low pressure zone occurring on the discharge side of the motor.

In line with the foregoing object, further objects of the invention include the provision of: valve mechanism for metering the fluid and applying metered fluid pressure pulsations at a rate increasing with motor speed; means connected with the valve mechanism and with the pressure sealing member and intervening in a manner to smooth out said pulsations so that the sealing member is sustained in a stabilized state with substantially uniform pressure behind it; and valve mechanism with flow sensitive characterstics for automatically directing fluid into the metering valve from an upstream direction with reference to the motor and for directing fluid escaping from the restriction into a zone on the downstream side with respect to the motor.

Other objects of the invention will be apparent when the following description is read in connection with the accompanying drawings which form a part hereof and in which.

Figure 2:
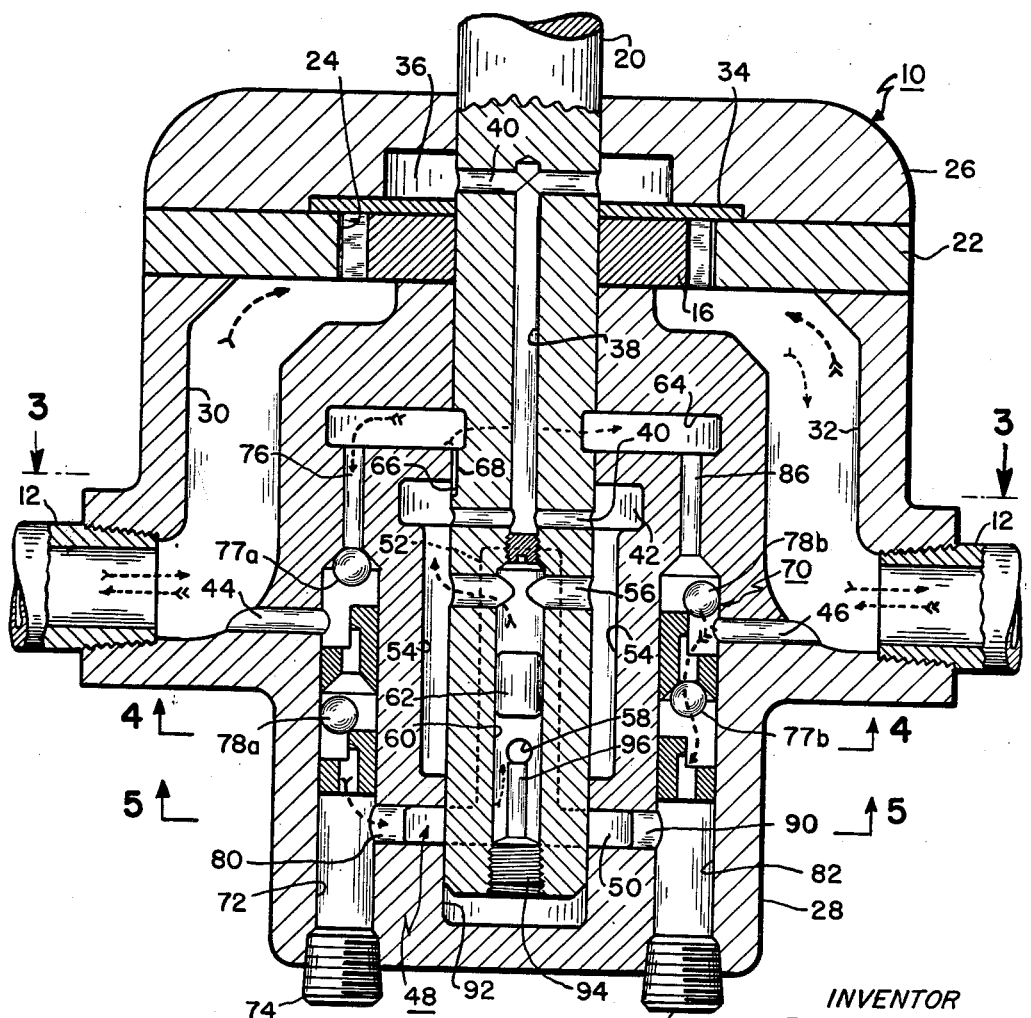
FIG. 2 is a longitudinal sectional view in plan of the motor taken along the lines 2—2 of FIG. 1.
Figure 3:
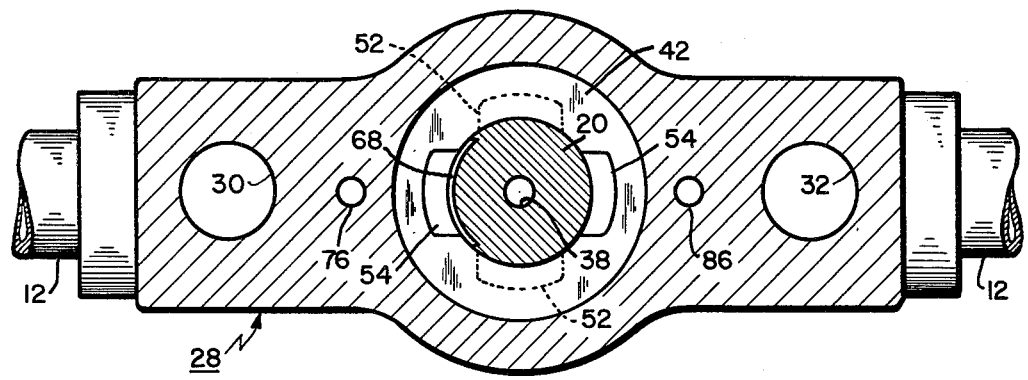
Figure 4:
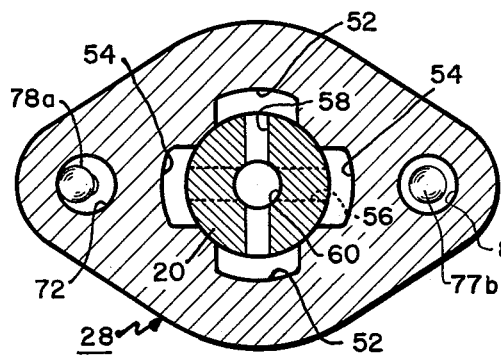
Figure 5:
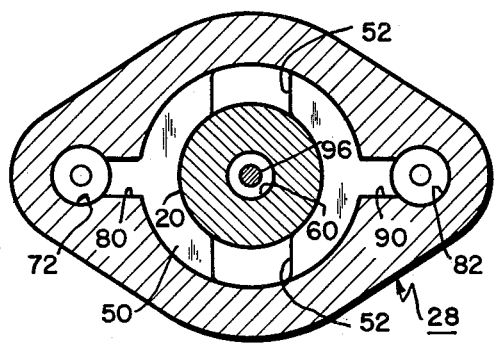
Figure 6:
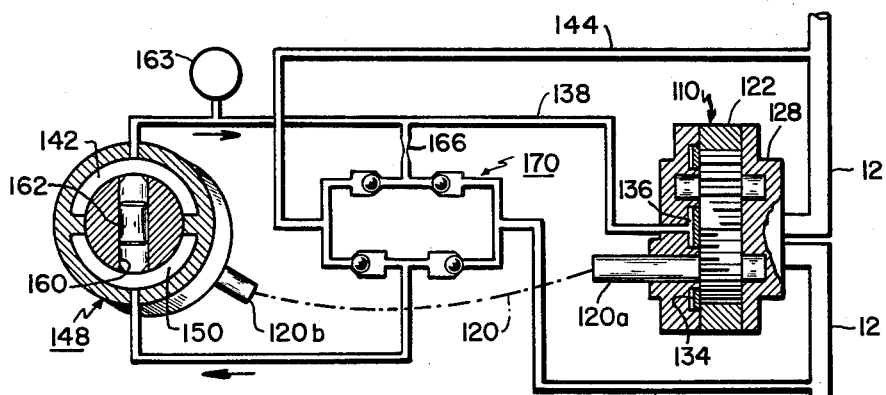

FIGS. 3, 4, and 5 are transverse sectional views taken along the lines 3—3, 4—4, and 5—5 of FIG. 2; and FIG. 6 is a schematic view of a hydraulic system having a modified arrangement with the motor and valve components separated.

Figure 1:
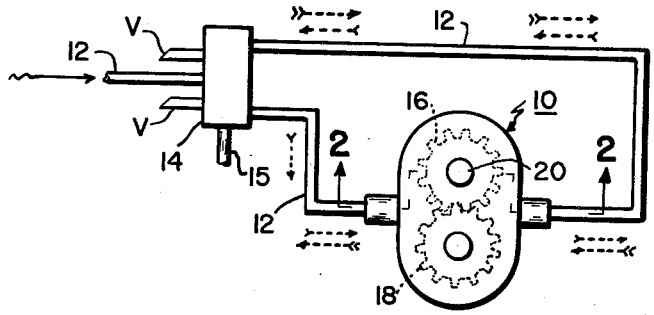
FIG. 1 shows a hydraulic system with a reversible motor connected therein embodying the present invention.

In particular reference to FIG. 1 of the drawings, a reversible positive-displacement motor 10 having a single casing is shown connected in a motive fluid line 12. The line 12 is supplied with fluid under pressure and includes a reversing valve 14 in circuit with the motor 10 and having a suitable operating member 15. Incoming fluid from the direction indicated by the solid arrow can be directed by the valve 14 in the direction of either the single tailed arrows or the double tailed arrows and fluid exhausted from the line 12 leaves through sump connected vents V. The source of the pressure fluid and the sump are conventional and are not shown.

The rotor means in the particular motor 10 illustrated consists of a pair of meshing spur gears 16 and 18 which are mounted on individual longitudinally extending shafts, one of the shafts comprising the motor output shaft 20. The shaft 20 rotates one way or the other depending on the direction of fluid flow through the line 12.

In FIGURES 2–5, the output shaft 20 is journaled for rotation in the casing of the motor 10, the casing consisting of a body housing 22 containing a chamber 24 for the rotor means, an end plate 26 at one end of the body housing 22 and secured to the housing at that end, and another end plate 28 secured to the body housing 22 at the opposite end and constituting a housing for plural valves.

End plate 28 is provided with main fluid passages 30 and 32, the outer ends of which are connected to line 12, and the inner ends of which communicate with rotor chamber 24 on opposite sides of the rotor means 16 and 18.

A sealing plate 34 together with end plate 26 and a central recess therein, define a pressure loading zone 36. As will be explained hereinbelow, rotor speed controlled fluid pressure in zone 36 causes the plate 34 to seal against the adjacent surfaces of the rotor means 16 and 18, when the pressure is sufficiently high, thus preventing escape of fluid along the gear faces from the high pressure side of the rotor chamber 24 to the low pressure side thereof.

The invention includes a rotor speed responsive means interposed in a sealing pressure control branch line or passage which by-passes a limited quantity of input pressure fluid around the rotor chamber 24, and which utilizes at least a portion of the by-passed fluid to control and vary the fluid pressure in pressure loading zone 36. This sealing pressure controlling means is specifically shown as a reversible rotary fluid metering mechanism which includes certain ducts in an end of shaft 20, and surrounding ducts, chambers, valves, and a floating piston in end plate 28. The metering mechanism operates equally well regardless of the direction of flow of input fluid through the motive fluid line 12, and regardless of the direction of rotation of the motor output shaft 20.

As seen in FIG. 2, one end of output shaft 20 passes through and is rotated by rotor gear 16. This end of the shaft is also journaled in the outer end of end plate 28 in bearing 92.

End plate 28 is provided with a pair of longitudinally disposed check valve controlled passages 72 and 82, located on opposite sides of shaft 20, and a pair of respectively communicating check valve controlled passages 76 and 86. Passages 72 and 76 communicate with main passage 30 by means of a duct 44, and passages 82 and 86 communicate with main passage 32 by means of a similar duct 46.

An annular pressure fluid discharge chamber 64 concentrically surrounds shaft 20 in the end plate 28, and provides open communication between the communicating ends of passages 76 and 86.

Check valves 77a and 78b allow flow of pressure fluid from chamber 64 into the respective main passages 30 and 32, but prevent flow from these main passages directly into chamber 64.

Similarly, an annular upstream pressure chamber 50 concentrically surrounds shaft 20, and provides open communication, through ducts 80 and 90 with passages 72 and 82, respectively.

Check valves 78a and 77b allow flow of fluid from the respective ducts 44 and 46 into pressure chamber 50, but prevent flow in the opposite direction.

At opposite locations about its periphery, 180° apart, chamber 50 is in open communication with a pair of longitudinally disposed ducts 52, which are recessed radially into the wall of end plate 28, as more clearly shown in FIG. 5. The ducts 52 extend alongside shaft 20 toward, but terminate short of, an intermediate chamber 42.

Chamber 42 surrounds shaft 20, and communicates openly with a pair of longitudinally disposed ducts 54 (FIGS. 2 and 4), which are likewise recessed radially into the wall of end plate 28. Ducts 54 also extend alongside shaft 20, but toward chamber 50, and terminate short of that chamber. Ducts 54 are positioned on opposite sides of chamber 42, 180° apart, but their positions are spaced 90° angularly from the ducts 52.

As clearly seen in FIG. 2 a longitudinally disposed slot 66, recessed into the surface of shaft 20, provides a fluid orifice 68 (FIGS. 2 and 3) for limited flow of fluid from chamber 42 into chamber 64.

Additionally, shaft 20 is provided with an axial bore 60, extending inward from its outer end, and communicating cross bores 56 and 58 which are positioned normal to each other to communicate alternately with ducts 52 and 54 as shaft 20 rotates.

Shaft 20 is also provided with an axial pressure tapping bore 38, and cross bores 40 which communicate with opposite ends of bore 38, and afford continous communication between pressure loading chamber 36 and intermediate chamber 42, through bore 38, as shaft 20 rotates.

As a means of determining the volume of fluid permitted to reach chamber 42, and hence chamber 36, during each revolution of shaft 20, a free floating piston 62 is mounted in the bore or cylinder 60, between cross ducts 56 and 58.

The permitted length of stroke of piston 62 is determined by the inner end of bore 60 and the inner end of an elongated stop 96, which is carried by a plug 94, which seals the outer end of bore 60.

Operation

Operation, with input motive fluid entering the above described motor through main fluid passage 30 and discharging through main passage 32, is indicated by the single tailed arrows in FIGS. 1 and 2.

When motive fluid enters rotor chamber 24, a sub-sealing pressure exists in loading pressure control zone or chamber 36, i.e.—a pressure well below the pressure required to urge the inner surface of sealing plate 34 into sealing engagement with the adjacent faces of rotor 16 and 18. This sub-sealing pressure exists because there is no direct communication between motive fluid bleed-off duct 44 and chamber 36.

With sub-sealing pressure existing in chamber 36, there is consequently little or no frictional contact between plate 34 and rotors 16 and 18. Hence there is relatively little frictional resistance against rotational starting of gears 16 and 18. This condition provides high starting torque for the motor—considerably higher torque than if chamber 36 was initially pressurized with full motive fluid pressure, as is common practice.

When valve 14 is first opened to allow motive fluid to flow into passage 30, motive fluid is by-passed through duct 44, valve 78a, bore 72, duct 80, chamber 50, ducts 52, and cross bore 58 into cylinder 60, below the piston 62. This fluid pressure forces piston 62 to the upper end of its stroke, and displaces fluid above the piston outward through cross bore 56, ducts 54 and into chamber 42, from which it escapes freely through orifice 68, chamber 64, bore 86, valve 78b and duct 46 into discharge passage 32. Due to the small volume of fluid displaced by piston 62, and due to its free escape passage through orifice 68, there is no rise in fluid pressure in loading chamber 36 at this early stage in motor operation.

When rotor 16 has rotated shaft 20 90° from its position shown in FIG. 2, cross bore 56 moves into communication with ducts 52, and cross bore 58 into communication with ducts 54. By-passed motive fluid then flows from duct 44 through the previously specified by-pass path or branch line, and from duct 52 through cross bore 56 into cylinder 60 above piston 62. The piston is forced to the lower end of its permitted stroke, and displaces fluid from the cylinder space below it through cross bore 58, ducts 54, chamber 42, orifice 68, and thence through the previously specified by-pass path or branch line to discharge passage 32, from which it passes to the system reservoir (not shown).

During each quarter revolution of shaft 20, then, piston 62 travels one complete stroke, discharging a predetermined quantity of motive fluid into intermediate chamber 42 during each stroke.

Since the frequency of piston strokes is in direct proportion to the rotational speed of shaft 20, the volume of fluid delivered into intermediate chamber 42 by piston 62 increases after the rotor means has performed its load starting task and its rotational speed increases. At some rotor speed before the rotor reaches normal operating speed, the volume of fluid being delivered to chamber 42 is greater than can escape through orifice 68. Consequently the pressure in chamber 42 rises, and is transmitted through tap bore 38 to pressure loading zone or chamber 36. Pressure in chamber 36 then forces sealing plate 34 into sealing engagement with the adjacent surfaces of rotors 16 and 18, and the operating efficiency of the motor reaches normal.

As long as the motor runs at or near normal operating speed the sealing presure in chamber 36 is maintained at or near motive fluid input pressure, which maintains adequate sealing pressure against plate 34.

If the rate of metered fluid pulsations from the free piston 62 is reduced due to slowing down or stopping of the motor, the capacity of the orifice 66 is such that it more readily accommodates the flow of liquid escaping from the intermediate chamber 42 into the discharge-pressure chamber 64 and hence the pressure in the pressure loading zone 36 is materially reduced. The static friction of the plate 34 against the gears 16 and 18 is also relieved and thus when the motor is again permitted to rotate the starting torque will be high, due to the low biasing pressure on the plate 34, and the reduced friction between plate 34 and the rotor faces.

Operation of the reversing valve 14 causes the fluid flow to take the direction of the double-tailed arrows of FIGS. 1 and 2, reversing the direction of the gears 16 and 18 and reversing the shaft 20. Flow through the metering valve 48 is the same as before, namely, from the upstream pressure chamber 50, through the piston bore 60 and the intermediate chamber 42, and into the discharge-pressure chamber 64. However the check valves 78a and 78b remain seated whereas the valves 77a and 77b now move off their seat once with each pulse of the free piston 62; that is to say, the valve 77b unseats to admit fluid through the duct 46 and the valve 77a unseats to permit escaping fluid to pass through duct 44 and into the discharge pressure side of the main passage 30. Irrespective of direction of flow, the metering valve 48 and the orifice 66 continue operation as an effective mechanism to maintain a sub-sealing pressure in the pressure loading zone 36 during starting and slow speed rotation of the shaft 20, and responsive to an increase in shaft speed to increase the pressure in pressure loading chamber 36 to full sealing pressure in response to normal running speeds of the shaft 20.

Although an accumulator for the fluid may be provided operatively connected to the intermediate chamber 42, it is not shown in the drawings and it is not particularly desirable inasmuch as the plurality of passages 56 and 58 and ducts 52 and 54 (FIG. 4) provide pulses at a four to one frequency to shaft speed irrespective of the shaft speed or direction. At higher speeds, these pulses fairly effectively blend into one another with no particular peaks. The particular arrangement of the ducts 54 and 52 by pairs eliminates the undesirability of side loading on the shaft 20 and this shaft stays in hydraulic balance at all times.

In the embodiment of FIG. 6, the metering valve mechanism 148 and the flow discrimination valve mechanism 170 are not included in the same casing as the motor 110, but are made separate from one another and from end plate 128 of the casing of the motor. An intervening connection 120 mechanically connects the main output shaft of the motor 110 and the shaft 120b of the metering valve mechanism 148.

A bore 160 for the free piston 162 connects a semicircular upstream-pressure chamber 150 in the mechanism 148 and a semicircular intermediate chamber 142. The bore 160 and piston 162 are in a transverse disposition within the shaft 120b. The flow discrimination valve mechanism 170 switches the flow of the control pressure branch line in the manner of the preceding embodiment so that the metering valve 148 and the orifice 166 remain hydraulically arranged in the respective upstream and downstream end positions with respect to the point in the branch line at which a tap 138 is connected. The tap 138 communicates loading pressure to a loading zone 136 behind a pressure loading plate 134 in the motor 110.

The metering pressure chamber at one end of the piston bore 160 changes from its connection with one of the chambers 142 and 150 to the other one of the chambers at the same time at which the metering chamber at the opposite end of the bore changes its connection with the chambers. It will be noted that the piston 162 moves in a transverse direction with respect to the shaft 120b and that it changes its direction once for each 180° of rotation of that shaft. Since only two pulses occur for each shaft rotation, a miniature accumulator 163 can be interposed at a point intermediate chamber 142 and orifice 166 for damping out the resulting pulsations.

Frequency of the pulses is in direct portion to the rotational frequency of the shafts 120, 120a and 120b, namely two to one, regardless of shaft speed or direction. Fluid flows between the valve mechanism 170 and the upstream pressure chamber 150 in the direction indicated by the arrow, and is received from lines 144 or 146, whichever is upstream. Discharged fluid flowing in the direction of the arrow between the intermediate chamber 142 and the orifice 166 passes from the orifice 166 into the valve mechanism 170 and through the other one of the lines 144 or 146 to the line 12.

By providing the mechanism of the present invention, it is possible to eliminate pressure loading during starting, which makes it possible to deliver a high starting torque to the motor shaft. The control is effective to change the pressure acting on the pressure sealing plate in proportion to the specific speed of rotation of the motor. It is equally effective in both directions of rotation.

While certain preferred embodiments of the invention have been shown and described in detail to illustrate the application of the present principles, it should be understood that those skilled in the art may embody the invention otherwise without departing from such principles.

Having described the invention with sufficient clarity to enable those familiar with this art to construct and use it, I claim:

1. In a hydraulic system having a main fluid line which is adapted to be supplied with motive fluid under pressure and which includes a pressure loaded fluid motor, said motor comprising a housing, a rotor chamber therein through which the line fluid passes, and angularly turning shaft means comprising a motor output shaft, fluid driven rotor means rotatably supported by said shaft means in said chamber and effective to drive the motor output shaft, the improved construction comprising: a speed responsive, loading pressure control branch line having an end connection to said main fluid line, a sealing member connected with the main fluid line and disposed in said motor housing in a confronting position to said rotor means for urging by said loading pressure into forced sealing engagement with said rotor means, and motor speed responsive mechanism in said branch line effective to maintain a sub-sealing pressure against said sealing member during starting and slow speed rotation of said rotor means, and responsive to an increase in rotor speed to increase the loading pressure against said sealing member for effecting said sealing engagement.

2. In a hydraulic system having a main fluid line which is adapted to be supplied with motive fluid under pressure and which includes a pressure loaded fluid motor, said motor comprising a housing, a rotor chamber therein through which the line fluid passes, and fluid driven motor means rotatably supported in said chamber and effective to drive the motor output shaft, the improved construction comprising: a speed responsive, loading pressure control branch line having an end connection to said main fluid line, a sealing member connected with the fluid line and disposed in said motor housing in a confronting position to said rotor means for urging by said loading pressure into forced sealing engagement with said rotor means, and a rotary metering valve in said branch line effective to maintain a sub-sealing pressure against said sealing chamber during starting and slow speed rotation of the said rotor means, and resposive to an increase in rotor speed to increase the loading pressure against said sealing member for effecting said sealing engagement.

3. In a hydraulic system having a main fluid line which is adapted to be supplied with motive fluid under pressure and which includes a pressure loaded fluid motor, said motor comprising a housing, a rotor chamber therein through which the line fluid passes, and fluid driven rotor means rotatably supported in said chamber and effective to drive the motor output shaft, the improved construction comprising: a speed responsive, loading pressure control branch line bypassing said motor and having end connections to said main fluid line at points on opposite sides on said rotor means, a sealing member connected with the fluid inside said loading pressure control branch line and disposed in said motor housing in a confronting position to said rotor means for urging by said loading pressure into forced sealing engagement with said rotor means, and motor-speed-responsive mechanism in said branch line effective to maintain a sub-sealing pressure against said sealing member during starting and slow speed rotation of said rotor means, and responsive to an increase in rotor speed to increase the loading pressure against said sealing member and to thereafter maintain a predetermined pressure not exceeding a maximum against said sealing member during any period in which the rotor means is rotating at normal operating speed.

4. In a hydraulic system having a main fluid line which is adapted to be supplied with motive fluid under pressure and which includes a pressure loaded fluid motor, said motor comprising a housing, a rotor chamber therein through which the line fluid passes, fluid driven rotor means rotatively supported in said chamber and effective to drive a motor output shaft, and a pressure sealing member in said housing defining one side of a pressure loading zone and urged in response to pressure in said zone into forced sealing engagement with a confronting portion of said rotor means, the improved construction comprising: a loading-pressure control branch bypassing said motor and having end connections into the line at points on opposite sides of said rotor means, a tap in said branch intermediate said end connections and connected to said pressure loading zone for communicating sealing pressure to said pressure sealing member, and mechanism in said branch comprising a rotary metering valve responsive to motor speed and effective to maintain a sub-sealing pressure in said pressure loading zone during starting and slow speed rotation of said rotor means, and responsive to an increased rotor speed to increase the pressure of said pressure loading zone, and to thereafter maintain a pressure range in said loading zone not exceeding a maximum during any period the rotor means is rotating at normal operating speeds.

5. The improved construction in a hydraulic system in accordance with claim 4, wherein the motive fluid line is arranged for reversing fluid flow through the motor so as to change the direction of rotation of the motor output shaft, said mechanism further including flow discrimination valve means arranged at points within said branch between said end connections and with flow passages therein for switching between said end connections so that line pressure fluid on the pressure side of said rotor means is directed to said metering valve from the main line and control loading fluid escapes into said main line on the discharge side of said rotor means, irrespective of direction of flow of motive fluid in said main line.

6. The construction in a hydraulic system according to claim 5, wherein said rotary metering valve comprises a housing with a plurality of radially relieved chambers therein, a shaft journaled in said housing having a piston bore formed therein and intersecting said chambers, a slidable piston dividing said bore into opposite metering chambers, which metering chambers communicate with successive ones of said radially relieved chambers as the shaft rotates and each of which metering chambers communicates with a different one of said radially relieved chambers from the other metering chamber at a given time whereby fluid pumped by the piston through one end of the bore into a radially relieved chamber is replenished by fluid delivered to the opposite end of the bore from another radially relieved chamber.

7. The construction in a hydraulic system according to claim 6 wherein said valve housing constitutes an end plate for and is consolidated as a single casing with the motor housing, and wherein the bore defines said longitudinally alined metering chambers in said valve shaft so that the piston has an axial path of reciprocation.

8. The construction in a hydraulic system according to claim 6, wherein said piston bore is transversely disposed in said valve shaft so that the piston travel is at right angles to the shaft axis.

9. The construction according to claim 5, wherein said flow discrimination valve means comprises a plurality of ball check valves by which said switching flow passages are automatically controlled to provide alternative cross connections leading between said end connections.

10. A hydraulic system comprising a main line, a pressure loading branch, a motor of the sealing member type connected in said main line and connected with the branch in bypassing relation to said motor, said motor having a body and having a motor shaft, and containing rotor means in the body connected for driving the motor shaft, a rotary metering valve connected in an upstream point in said pressure loading branch and rotated by said shaft so as to introduce pulses of metered fluid through the branch at a frequency rate proportionate to the shaft rotation, an orifice connected in a downstream point in said pressure loading branch and matched in capacity with respect to said valve to restrict the escape of fluid from said branch in a manner lowering the pressure between said points with decreasing rate of pulsation of fluid introduced, and a motor sealing member connected at one side with the fluid in the branch between said two points and arranged in said motor body with the other side of said member in a confronting relation to a moving portion of the rotor means so as to be urged into sealing engagement therewith under the loading branch pressure.

11. The system of claim 10, there being means of connection establishing said branch in the bypassing relation aforesaid with respect to said motor, including a plurality of flow discrimination check valve means arranged in said branch and providing cross connections so that fluid escaping out of the orifice in the branch automatically switches from flowing into said line at one side of the motor and flows into the line at the other side, and simultaneously fluid admitted for introduction by said metering valve automatically switches from flowing from the line at said other side of said motor into the metering valve and flows from the line at said one side into the metering valve, thereby maintaining the valve and the orifice always in the upstream-downstream relation aforesaid irrespective of line flow direction through the motor.

12. In a fluid pressure driven motor which includes a housing which defines a rotor chamber and an adjacent pressure loading chamber, a rotor in the chamber connected to an output shaft journaled in the housing, and a sealing member separating the rotor and pressure loading chambers and confronting a face of said rotor for sealing against said face under fluid pressure introduced into said pressure loading chamber, said housing having an inlet passage for conducting motive fluid to said rotor chamber, and an outlet passage for disposing of fluid discharged from said rotor chamber, the improvement which comprises: a rotor chamber by-passing branch line in communication with said inlet and outlet passages; and loading chamber pressure controlling mechanism interposed in said branch line and in communication with said pressure loading chamber, and responsive to the rotational speed of said motor output shaft to maintain a sub-sealing fluid pressure in said loading chamber during starting and slow speed rotation of said shaft, and to maintain an effective sealing pressure in said loading chamber during such time as the output shaft is rotating at or near normal operating speed.

References Cited in the file of this patent

UNITED STATES PATENTS

| | | |
|---|---|---|
| 69,383 | Andrew | Oct. 1, 1867 |
| 2,099,280 | Shaff | Nov. 16, 1937 |
| 2,137,384 | Browne | Nov. 22, 1938 |
| 2,326,803 | Samiran | Aug. 17, 1943 |
| 2,639,694 | Johnson | May 26, 1953 |
| 2,877,933 | Downing | Mar. 17, 1959 |
| 2,965,075 | Payne et al. | Dec. 20, 1960 |